United States Patent
Burke

(10) Patent No.: US 12,028,177 B1
(45) Date of Patent: Jul. 2, 2024

(54) AUTOMATED EMAIL ASSISTANT

(71) Applicant: Benjamin Lee Burke, Waxhaw, NC (US)

(72) Inventor: Benjamin Lee Burke, Waxhaw, NC (US)

(73) Assignee: Insight Direct USA, Inc., Chandler, AZ (US)

(*) Notice: Subject to any disclaimer, the term of this patent is extended or adjusted under 35 U.S.C. 154(b) by 0 days.

(21) Appl. No.: 18/378,542

(22) Filed: Oct. 10, 2023

(51) Int. Cl.
*H04L 12/18* (2006.01)
*G06F 40/40* (2020.01)
*G06Q 10/1093* (2023.01)

(52) U.S. Cl.
CPC .......... *H04L 12/1818* (2013.01); *G06F 40/40* (2020.01); *G06Q 10/1097* (2013.01)

(58) Field of Classification Search
None
See application file for complete search history.

(56) References Cited

U.S. PATENT DOCUMENTS

| | | | |
|---|---|---|---|
| 7,584,253 B2 | 9/2009 | Curbow et al. | |
| 9,213,952 B2 | 12/2015 | Heyman et al. | |
| 9,633,114 B1 | 4/2017 | Kamangar | |
| 10,163,074 B2 | 12/2018 | Wilkerson | |
| 10,394,750 B2 | 8/2019 | Bastide et al. | |
| 11,042,844 B2 | 6/2021 | Goyal | |
| 11,328,259 B2 | 5/2022 | Gamon et al. | |
| 2016/0086116 A1 | 3/2016 | Rao et al. | |
| 2019/0014070 A1 | 1/2019 | Mertvetsov et al. | |
| 2019/0189126 A1* | 6/2019 | Liu | G10L 15/22 |
| 2020/0327891 A1* | 10/2020 | Chhabra | H04L 51/04 |
| 2022/0391584 A1* | 12/2022 | Klein | G10L 15/005 |
| 2023/0135962 A1* | 5/2023 | Lee | G06F 40/216 |
| | | | 704/9 |
| 2023/0214786 A1 | 7/2023 | Vukich | |
| 2023/0401539 A1* | 12/2023 | Chandra | G06Q 10/1095 |
| 2023/0419270 A1* | 12/2023 | Li | H04L 65/403 |

FOREIGN PATENT DOCUMENTS

CA 3148108 A1 8/2023

* cited by examiner

*Primary Examiner* — Quang N Nguyen
(74) *Attorney, Agent, or Firm* — Kinney & Lange, P.A.

(57) ABSTRACT

A system for using generative AI to automate electronic communication responses includes receiving, from an initiating entity, an electronic communication at a receiving entity. The system provides the electronic communication to a large language model (LLM). The system provides instructions to the LLM, causing the LLM to evaluate the electronic communication to determine whether a meeting is requested, to produce a meeting indicator, to evaluate the electronic communication to determine if there are one or more tasks, to produce a task list, and to produce a responsive electronic communication based on user-defined rules. The system receives a dataset from the LLM. If a meeting is requested, the system identifies mutually available meeting times between the initiating and receiving entities. The system sends a meeting invitation at a mutually available meeting time. The system sends the responsive electronic communication. The system generates the tasks from the task list.

18 Claims, 3 Drawing Sheets

AUTOMATED EMAIL ASSISTANT

BACKGROUND

Electronic messaging, including email and instant messaging, can result in a lack of efficiency for the sender and receiver due to the number of actions needed to appropriately respond to an electronic message. For example, a message can require that a meeting be scheduled and that various tasks be allocated to the receiver. Further, the receiver must generate a response to the electronic message to acknowledge the receipt of the message. All of these actions may be necessary, but at the same time can disrupt the workflow of the receiver. Thus, a system for automating email responses and other actions arising from the email response is desirable.

SUMMARY

A system for using generative artificial intelligence (AI) for automating electronic communication responses includes a processor and computer-readable memory. The computer-readable memory is encoded with instructions that, when executed by the processor, cause the system to perform the following steps. The system receives, from an initiating entity, an electronic communication at a receiving entity. The system provides the electronic communication to a large language model. The system provides instructions to the large language model, which cause the large language model to: evaluate the electronic communication to determine whether a meeting is requested, produce a meeting indicator indicative of whether the meeting is requested, evaluate the electronic communication to determine whether the electronic communication contains one or more tasks, produce a task list including the one or more tasks, and produce a responsive electronic communication. The responsive electronic communication is tailored by a user-defined rule set. The system receives a dataset from the large language model. The dataset includes the meeting indicator, the task list, and the responsive electronic communication. The system identifies a mutually available meeting time between the initiating entity and the receiving entity. The system sends a meeting invitation to the initiating entity at the mutually available meeting time. The system sends a meeting invitation to the initiating entity at the mutually available meeting time. The system generates the one or more tasks based upon the task list and provides the one or more tasks to the receiving entity.

A method for using generative artificial intelligence (AI) for automating electronic communication responses, includes receiving an electronic communication from an initiating entity at a receiving entity. The method further includes providing the electronic communication to a large language model. The method further includes providing instructions to the large language model which cause the large language model to: evaluate the electronic communication to determine whether a meeting is requested, produce a meeting indicator indicative of whether a meeting is requested, evaluate the electronic communication to determine whether the electronic communication contains one or more tasks, produce a task list including the one or more tasks, and produce a responsive electronic communication. The responsive electronic communication is tailored by a user-defined rule set. The method further includes receiving a dataset from the large language model. The dataset includes the meeting indicator, the task list, and the responsive electronic communication. The method further includes identifying a mutually available meeting time between the initiating entity and the receiving entity. The method further includes sending a meeting invitation to the initiating entity at the mutually available meeting time. The method further includes sending the responsive electronic communication to the initiating entity as a response to the electronic communication. The method further includes generating the one or more tasks based upon the task list and providing the one or more tasks to the receiving entity.

DETAILED DESCRIPTION

The techniques of this disclosure utilize a generative artificial intelligence large language model within an automation workflow to automate email responses, schedule meetings, and add tasks to a task list. The large language model takes in a received electronic message as an input and produces a response. The large language model also evaluates whether any meetings are requested based upon the received electronic message. The large language model also evaluates whether there are any tasks indicated in the received electronic message. The automation workflow then receives an output from the large language model and, in response, automatically sends a responsive electronic message responding to the received electronic message, automatically sends out meeting invitations to identified parties based on availability, and generates any tasks to be performed.

Figure 1:
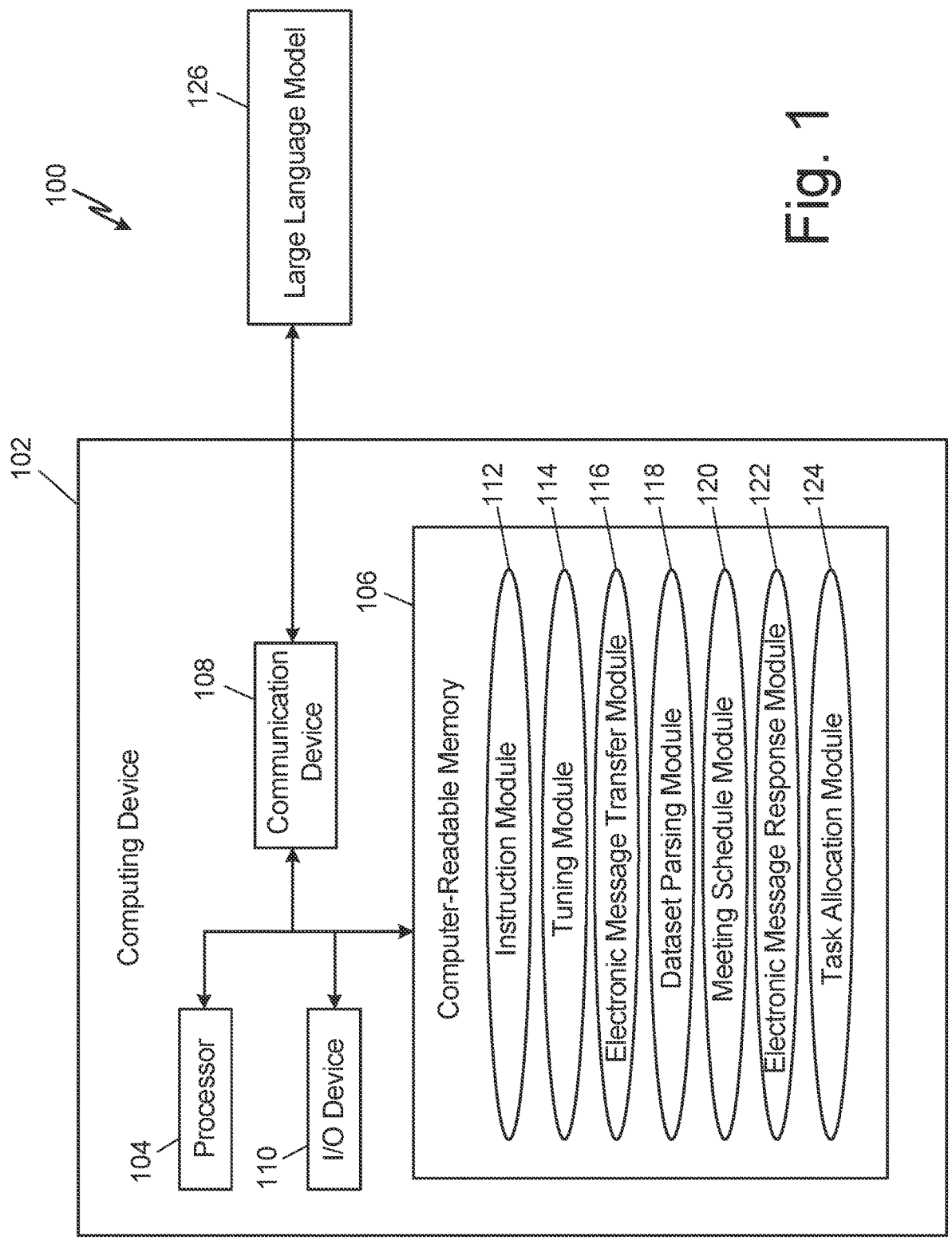
FIG. 1 is a diagram of a system for using generative artificial intelligence (AI) to automatically respond to a received electronic communication.

FIG. 1 is a diagram of system 100 for using generative artificial intelligence (AI) to automatically respond to an email. System 100 includes computing device 102 and large language model 126. Computing device 102 includes processor 104, computer-readable memory 106, communication device 108, and input/output device 110. Computer-readable memory 106 includes instruction module 112, tuning module 114, electronic message transfer module 116, dataset parsing module 118, meeting scheduling module 120, electronic message response module 122, and task allocation module 124.

Processor 104, in some examples, is configured to implement functionality and/or process instructions for execution within system 100. For instance, processor 104 can be capable of processing instructions stored in computer-readable memory 106. Examples of processor 104 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 106, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, computer-readable memory 106 is a temporary memory, meaning that a primary purpose of computer-readable memory 106 is not long-term storage. Computer-readable memory 106, in some examples, is described as volatile memory, meaning that computer-readable memory 106 does not maintain stored contents when electrical power to computer-readable memory 106 is removed. Examples of volatile memories can include random access memories (RAM), dynamic random access memories (DRAM), static random access memories (SRAM), and other forms of volatile memories. In some examples, computer-readable memory 106 is used to store program instructions for execution by processor 104. Computer-readable memory 106, in one example, is used by software or applications to temporarily store information during program execution.

Computer-readable memory 106, in some examples, also includes one or more computer-readable storage media. Computer-readable memory 106 is configured to store larger amounts of information than volatile memory. Computer-readable memory 106 is further configured for long-term storage of information. In some examples, computer-readable memory 106 includes non-volatile storage elements. Examples of such non-volatile storage elements include, but are not limited to, magnetic hard discs, optical discs, flash memories, or forms of electrically programmable memories (EPROM) or electrically erasable and programmable (EEPROM) memories.

Input/output device 110 is configured to receive inputs for system 100 and to provide outputs generated by system 100 for use by a user and/or other consuming system of such outputs. For example, input/output device 110 can include input elements in the form of a mouse, a keyboard, a microphone, a camera device, a presence-sensitive and/or touch-sensitive display, or other type of device configured to receive input from a user. In certain examples, input/output device 110 can include communication devices usable to communicate with external devices via one or more wired or wireless networks, or both. For instance, communication devices can take the form of a network interface card (e.g., an Ethernet card), an optical transceiver, a radio frequency transceiver, or other type of device that can send and receive information, such as Bluetooth, and/or 3G. Input/output device 110 can also include output elements, such as a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

Processor 104, computer-readable memory 106, communication device 108, and input/output device 110 are interconnected within computing device 102. Communication device 108 is operably connected to large language model 126. Large language model 126 is depicted as being external to computing device 102. In some embodiments, large language model 126 is hosted on a cloud server external to computing device 102. In other embodiments, large language model 126 is hosted on a local server external to computing device 102. In still other embodiments, large language model 126 can be hosted on a server contained within computing device 102.

In operation, computer-readable memory 106 is encoded with instructions that are executed by processor 104. System 100 can automatically begin operation upon receipt of a received electronic message. Thus, for example, if a user of system 100 receives an email, processor 104 begins operation of system 100 by executing the instructions contained within computer-readable memory 106. In some embodiments, the operation of system 100 is triggered manually. Thus, for example, system 100 is configured to begin operation upon the user sorting a received email into a specified folder via input/output device 110. Thus, upon the email being sorted into the specified folder, processor 104 executes the instructions contained within computer-readable memory 106.

Computer-readable memory 106 includes instruction module 112, which includes one or more programs containing large language model instructions. The large language model instructions provide guidelines as to how large language model 126 should evaluate and respond to a received electronic communication. Upon execution of instruction module 112 by processor 104, the large language model instructions are sent to large language model 126 via communication device 108. The large language model instructions contained within instruction module 112 can include a preliminary instruction indicating that large language model 126 is an artificial intelligence assistant that responds to electronic messages for a user. The large language model instructions can further include instructions to generate a response to the received electronic message including answering any inquiries and/or asking follow-up questions if necessary. The large language model instructions can further include instructions to indicate any actionable tasks within the received electronic message and to indicate whether a meeting is requested or suggested.

The large language model instructions can further include instructions as to the tone or length of the response. For example, the large language model instructions can indicate that large language model 126 should respond with a certain degree of humor, and/or that large language model 126 should be concise in its response. The large language model instructions can further include instructions to compile a dataset output including a meeting indicator indicative of whether a meeting is requested, a task list including one or more tasks from the received electronic communication, and a responsive electronic message, in a specified format. In some embodiments, the specified format is a JavaScript Object Notation (JSON) format. The large language model instructions can further include instructions to send the dataset output from large language model 126 to communication device 108. Additional description regarding the large language model instructions is provided below in the description of FIG. 3.

Computer-readable memory 106 further includes tuning module 114, which includes one or more programs containing tuning data. The tuning data includes data designed to develop and optimize large language model 126 to better process a received electronic message. Upon execution of tuning module 114 by processor 104, the tuning data is sent to large language model 126 via communication device 108. The tuning data can include instructions as to one or more tasks large language model 126 should perform upon receiving an electronic message. Tuning module 114 can also include context, wherein the context is additional or external information designed to direct large language model 126 to more relevant responses to the received electronic message. Tuning module 114 can also include an example interaction including an example large language model input and an example expected response. Thus, for example, in the present application the tuning data can include a sample electronic message as the input to large language model 126, wherein a sender asks a receiver "please send me yesterday's file and let's find some time to discuss". The tuning data can further include a sample expected response from large language model 126, such as "I'm an AI assistant. I will remind [receiving entity] to send you yesterday's file shortly. I will schedule a meeting to discuss this matter, please look out for a meeting invitation in your inbox." The sample electronic message and sample expected response are merely intended to be illustrative of using an example interaction as tuning data for large language model 126, and are intended to be non-limiting.

Computer-readable memory 106 further includes electronic message transfer module 116, which includes one or more programs to send the received electronic message to large language model 126. Upon execution of electronic message transfer module by processor 104, the received electronic message is sent to large language model 126 via communication device 108. Upon receiving the received electronic message, large language model 126 produces the dataset output based upon the large language model instructions and the tuning data. As described, the dataset output can be compiled in a specified format, such as JSON, and can contain the meeting indicator indicative of whether a meeting is requested, the task list including one or more tasks from the received electronic communication, and the responsive electronic message. Large language model 126 sends the dataset output to computing device 102 via communication device 108.

Computer-readable memory 106 further includes dataset parsing module 118, which can include one or more programs for parsing the dataset received from large language model 126. Upon execution of dataset parsing module 118, processor 104 parses the dataset output received from large language model 126. Parsing the dataset output can include interpreting the meeting indicator to determine whether a meeting is requested, and hence whether a meeting should be automatically scheduled. Parsing the dataset output can further include identifying the task list including the one or more tasks from the received electronic communication. Parsing the dataset can further include identifying the responsive electronic message.

Computer-readable memory 106 further includes meeting scheduling module 120. Meeting scheduling model 120 can include one or more programs for generating and sending a meeting invitation in response to the meeting indicator within the dataset output indicating that a meeting is requested. Upon execution of electronic message response module 122, processor 104 determines if scheduling a meeting is necessary. If the meeting indicator from the dataset output indicates that no meeting is necessary, processor 104 takes no action. If the meeting indicator from the dataset output indicates that a meeting is necessary, processor 104 accesses a calendar from an initiating entity (i.e., the entity which sent the received electronic message) and a calendar from a receiving entity (i.e., the entity which responds to the received electronic message using system 100). Processor 104 examines the calendar of the initiating entity and the calendar of the receiving entity to determine a mutually available meeting time. In some embodiments, the mutually available meeting time is the first available meeting time between the initiating entity and the receiving entity. Upon determining the mutually available meeting time, processor 104 then schedules the meeting on the calendar of the initiating entity and the calendar of the receiving entity.

In some embodiments, the duration of the mutually available meeting time is set to a default value. In other embodiments, the large language model instructions further contain an instruction to estimate the duration of the meeting and to return the duration within the dataset output. In such an embodiment, the duration of the meeting time is set to the estimate provided by large language model 126.

In some embodiments, a meeting may be requested between one or more entities in addition to the initiating entity and the receiving entity. In such an embodiment, meeting scheduling module 120 can further include one or more programs for identifying the one or more additional entities which received the received electronic message and scheduling the meeting with the one or more additional entities. In such an embodiment, upon execution of meeting scheduling module 120, processor 104 searches the calendars of the initiating entity, the receiving entity, and all additional entities to determine a mutually available meeting time. In an illustrative example, initiating entity A sends an electronic message to receiving entity B, and carbon copies additional entities C and D indicating that all parties should meet. In this example, processor 104, upon execution of meeting scheduling module 120, searches the calendars of entities A, B, C, and D to find a mutually available meeting time, and thereafter sends a meeting invitation to entities A, B, C, and D. This example is merely intended to be illustrative and non-limiting.

Computer-readable memory 106 further includes electronic message response module 122. Electronic response module 122 can include one or more programs for generating and sending an electronic message in response to the received electronic message. Upon execution of electronic message response module 122, processor 104 generates an electronic response addressed to the initiating entity. Processor 104 also inputs the responsive electronic message received from the dataset output into the body of the electronic message. In some embodiments where the meeting indicator from the dataset output indicates that a meeting is requested, processor 104 also provides an indication that the initiating entity will receive a meeting invitation at the mutually available meeting time, as determined by the execution of meeting scheduling module 120.

Computer-readable memory 106 includes task allocation module 124. Task allocation module 124 can include one or more programs for creating and naming one or more tasks as received from the task list of the dataset output. Upon execution of task allocation module 124, processor 104 determines if there are tasks within the task list that need to be created. If the task list from the dataset output contains no tasks to be created, processor 104 takes no action. If the task list from the dataset output contains one or more tasks, processor 104 creates a task based upon the task list of the dataset output. Processor 104 can be configured to create the task in a known task allocation program (e.g., Microsoft Teams), or can be configured to generate a new text-based task list. The task can be created such that it is assigned to the receiving entity. After creating the task, processor 104 names the task based upon an identifier of the initiating entity. Thus, for example, if entity A is the initiating entity and a task within the task list is "send document", processor 104 can name the task "send document to entity A", thereby notifying the receiving entity who the task must be completed for. The creation and naming of the task is then repeated for each of the one or more tasks within the task list.

In some embodiments, the large language model instructions contain an additional instruction to determine whether the one or more tasks within the task lists include a completion data, and to return the completion date along with the corresponding task within the task list of the dataset output.

In such an embodiment, processor 104 is further configured to assign the due date to the corresponding task upon execution of task allocation module 124. In other embodiments, the large language model instructions further contain an instruction to generate a priority level (e.g., a "high", "medium", or "low") priority level for each of the one or more tasks within the task list, if such information is derivable from the received electronic message. In such an embodiment, processor 104 is further configured to assign the priority level to the corresponding task upon execution of task allocation module 124.

At the conclusion of the execution of task allocation module 124, the receiving entity can view the electronic message response, any applicable meeting invitations, and any generated tasks via input/output device 110. In some embodiments, the user can receive a preview of the electronic message response, the meeting invitations, and any generated tasks, prior to such elements being sent to the initiating entity, or any additional entities. In other embodiments, the operation of system 100 is automatic and occurs without any user intervention.

System 100 provides various advantages. System 100 allows for an automated response to a received electronic message, thereby minimizing the time required for a user to generate a response. The automated response is generated by operation of large language model 126 after providing instructions and the tuning data. Thus, the automated response will be within the defined bounds of the user's instructions. Further, the automation of meeting scheduling relieves the user from the need to manually check one or more other calendars to find a suitable meeting time, as the process is automated within the automation workflow of system 100. Additionally, the task allocation function of system 100 allows a user to see automatically generated tasks which are specific to the received electronic message. Again, this relieves the user of the burden of manually generating tasks upon reviewing the received electronic communication. Such automation is beneficial for the efficiency and for the focused work of the user.

Figure 2:
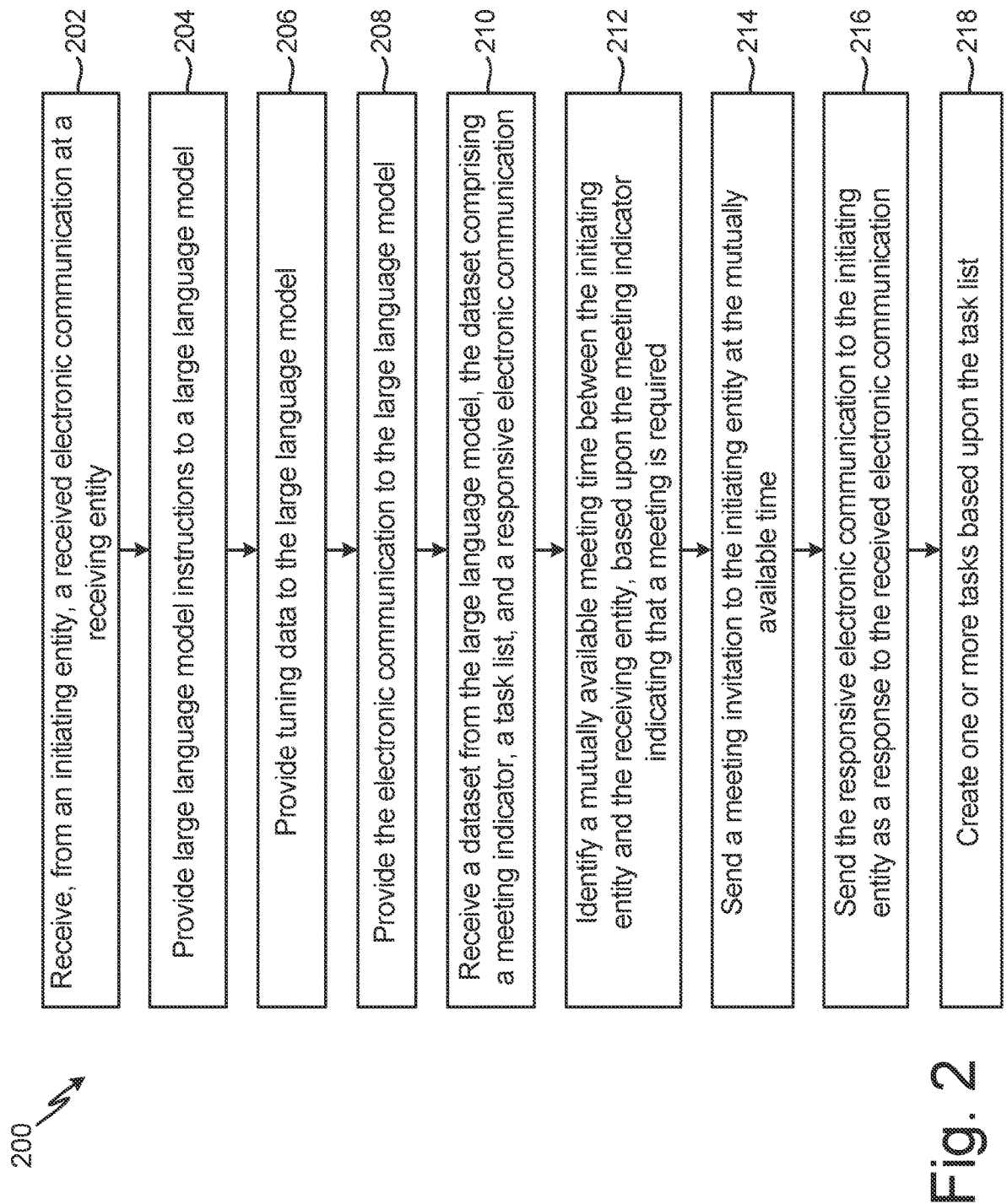
FIG. 2 is a flowchart of a method for using generative AI to automatically respond to the received electronic communication.

FIG. 2 is a flowchart of method 200 for using generative AI to automatically respond to an email. Method 200 is performable by system 100 of FIG. 1, and hence reference will be made to components of system 100 in the description of method 200.

Method 200 begins at step 202. At step 202, system 100 receives, from an initiating entity, a received electronic communication at a receiving entity. The received electronic communication can be, for example, an email, and instant message, or any other form of electronic communication. The received electronic communication can be received from a device within the same network as system 100 or a device external to the network of system 100. The received electronic communication can be stored within computer-readable memory 106.

At step 204, processor 104 provides large language model instructions to large language model 126. The large language model instructions are provided to large language model 126 by execution of instruction module 112. The large language model instructions can include, for example, instructions to generate a response to the received electronic message including answering any inquiries and/or asking follow-up questions, to indicate any actionable tasks within the received electronic message, and to indicate whether a meeting is requested or suggested. Additional details regarding the large language model instructions will be disclosed below in the description of FIG. 3.

At step 206, processor 104 provides tuning data to large language mode 126. The tuning data is provided to large language model 126 by execution of tuning module 114. The tuning data includes an example interaction including an example large language model input (e.g., the received electronic message) and an example expected response. The tuning data can act to train large language model 126 each time method 200 is executed. In another embodiment, method 200 does not include step 206, and instead completes step 204 then progresses to step 208, without providing tuning data to large language model 126.

At step 208, processor 104 provides the received electronic message to large language model 126. The received electronic message is provided to large language model 126 by execution of electronic message transfer module 112 and via communication device 108.

At step 210, processor 104 receives a dataset output from large language model 126 from large language model 126 via communication device 108. The dataset output includes a meeting indicator, a task list, and a responsive electronic communication. The large language model instructions can specify that the dataset output must be compiled in a specific format, such as a JSON format. Once received, processor 104 can parse the dataset output to extract the meeting indicator, one or more tasks from the task list, and the responsive electronic communication.

At step 212, processor 104 identifies a mutually available meeting time between the initiating entity and the receiving entity based upon the meeting indicator indicating that a meeting is requested. This step is performed by the execution of meeting scheduling model 120. To identify a mutually available meeting time processor 104 accesses a calendar from an initiating entity and a calendar from a receiving entity and determines a mutually available meeting time. In some embodiments, the mutually available meeting time is the first available meeting time between the initiating entity and the receiving entity. At step 214, processor 104 sends a meeting invitation to the initiating entity at the mutually available meeting time. If the meeting indicator does not indicate that a meeting is requested, no action is taken by processor 104 at step 212 or step 214.

At step 216, processor 104 sends the responsive electronic communication to the initiating entity as a response to the received electronic communication. The responsive electronic communication is sent by the execution of electronic message response module 122. Processor 104 inputs the responsive electronic message into the body of the responsive electronic communication. In some embodiments wherein a meeting is scheduled at the mutually available meeting time, processor 104 also provides an indication that the initiating entity will receive a meeting invitation at the mutually available meeting time.

At step 218, processor 104 creates one or more tasks based upon the received task list. The creation of the one or more tasks is done by the execution of task allocation module 124. Processor 104 can be configured to create the task in a known task allocation program (e.g. Microsoft Teams), or can be configured to generate a new text-based task list. The task can be created such that it is assigned to the receiving entity and such that the task is named based upon an identifier of the initiating entity. If there are no tasks in the task list, no action is taken by processor 104 at step 218.

Method 200 is a method implementation of the components of system 100, and hence provides the same advantages. Namely, method 200 is a method for generating an automatic response to a received electronic message, as well as automatic scheduling of a meeting (if necessary) and the automatic creation of tasks corresponding to the received electronic message (if necessary). The automation, again, speeds up the process of electronic message response and meeting scheduling over the manual execution of such tasks.

Figure 3:
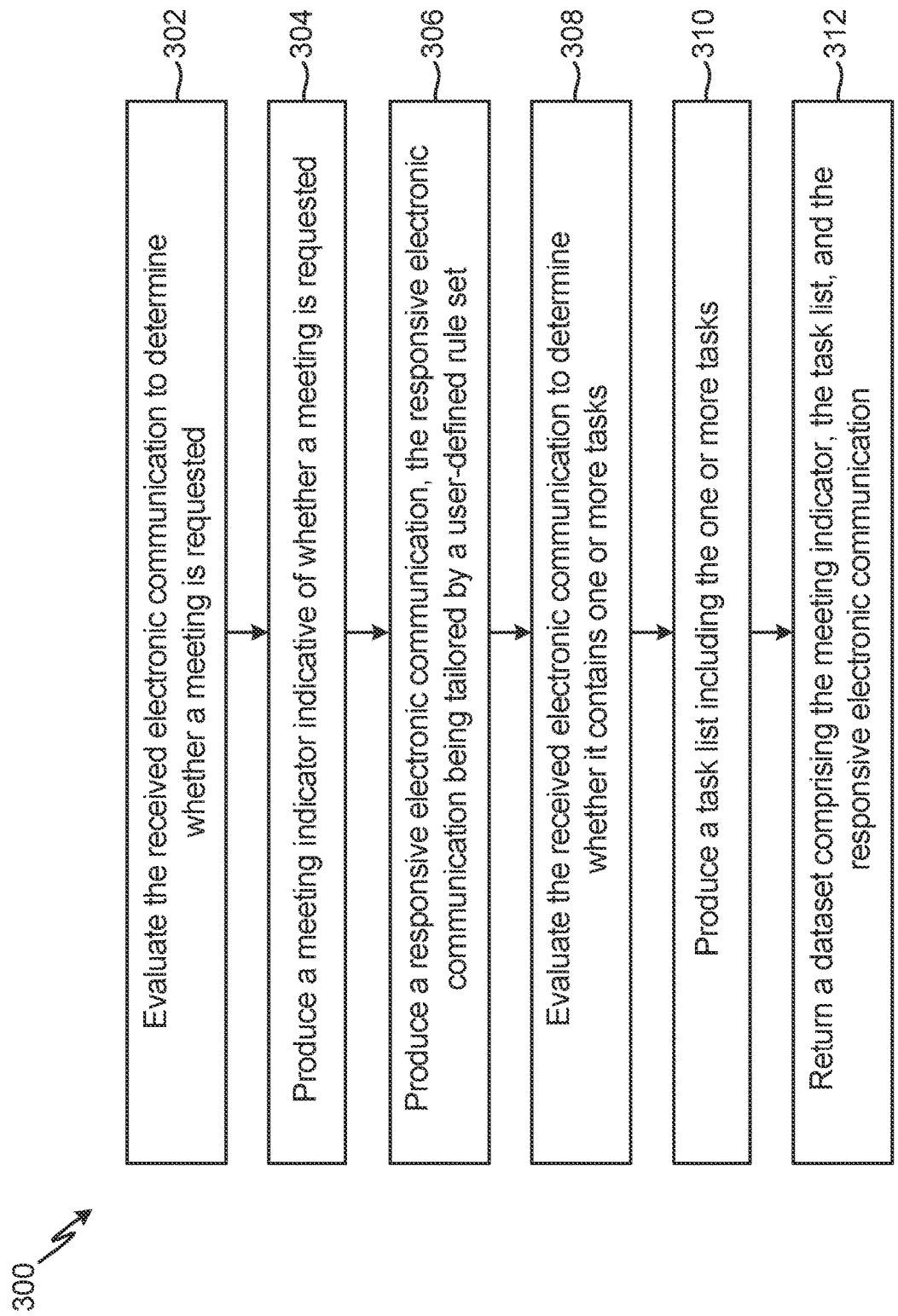
FIG. 3 is an example embodiment of instructions provided to a large language model with the system for using generative AI to automatically respond to the received electronic communication.

FIG. 3 an example embodiment of instructions 300 provided to large language model 126 within system 100. Instructions 300 are provided to large language model 126 at step 204 of method 200 and upon execution of instruction module 112 of system 100.

Instructions 300 begin at instruction 302, wherein large language model 126 is instructed to evaluate the received electronic communication to determine if a meeting is requested. In some embodiments, at step 302, large language model 126 can be further instructed to determine if the received electronic communication contains a suggested meeting date and time and/or a suggested meeting duration. In some embodiments, large language model 126 is instructed to estimate the duration of a meeting based upon the received electronic communication. Thus, for example, where the received email includes: "let's meet tomorrow to discuss our strategic plan for the year", large language model 126 can determine that the meeting should be scheduled tomorrow, and that the duration should be in excess of 1 hour. Conversely, where the received email includes: "let's meet this afternoon for a quick check-in on the project's progress", large language model 126 can determine that the meeting should be scheduled after 12:00 PM today and that the duration should be set to the minimum meeting duration of 15 minutes. These examples are merely intended to be illustrations of possible determinations made by large language model 126 based upon the instructions supplied.

At instruction 304, large language model 126 is instructed to produce a meeting indicator indicative of whether a meeting is requested. In some embodiments, the meeting indicator is a Boolean variable that indicates a true or false state as to whether a meeting is requested. In other embodiments, the meeting indicator is a data packet containing information as to whether a meeting is requested, suggested dates/times, and/or suggested durations, based upon the received electronic communication.

At instruction 306, large language model 126 is instructed to produce a responsive electronic communication. The responsive electronic communication is tailored by a user-defined rule set. The user-defined rule set can include rules regarding the tone, length, and content of the responsive electronic communication. For example, the user-defined rule set can instruct large language model 126 to generate the responsive electronic communication by being kind, brief, and slightly humorous. Further the user-defined rule set can instruct large language model 126 to ask follow up questions if necessary and to answer any questions posed within the received electronic communication.

At instruction 308, large language model 126 is instructed to evaluate the received electronic communication to determine whether the received electronic communication contains one or more tasks. In some embodiments, large language model 126 is further instructed to determine if there is a due date attached to the one or more tasks. In other embodiments, large language model 126 is further instructed to generate a priority level (e.g., a "high", "medium", or "low" priority level) for each of the one or more tasks within the task list, if such information is derivable from the received electronic communication.

At instruction 310, large language model 126 is instructed to generate a task list comprising the one or more tasks. In some embodiments, if applicable, the one or more tasks include the one or more respective due dates and/or the one or more respective priority levels.

At instruction 312, large language model 126 is instructed to return a dataset comprising the meeting indicator, the responsive electronic communication, and the task list. In some embodiments, the dataset is compiled in a JSON format or in another format specified within the large language model instructions.

As described with respect to FIG. 1, system 100 allows for an automated response to a received electronic message, thereby minimizing the time required for a user to generate a response. System 100 leverages the customizability of instructions 300 in order to generate the desired response. Instructions 300 can be customized by a user in order to achieve the desired tone, length, and/or content of the automated response. Further, instructions 300 allow for a determination of whether a meeting is requested and allow for the generation of a task list. Thus, instructions 300 allow for a user-tailored implementation of system 100.

According to the techniques of this disclosure, system 100 uses large language model 126 within an automation workflow to automate electronic message responses, schedule meetings, and add tasks to a task list. Large language model 126 is instructed to process a received electronic message and produce a response, a meeting indicator, and a task list. The automation workflow then receives an output from large language model 126 and, in response, automatically sends an electronic message responding to the received electronic message, sends out meeting invitations to identified parties based on availability and generates any tasks to be performed. The techniques of this disclosure allow for an efficient and customizable system and method for responding to received electronic messages.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

A system for using generative artificial intelligence (AI) for automating electronic communication responses includes a processor and computer-readable memory. The computer-readable memory is encoded with instructions that, when executed by the processor, cause the system to perform the following steps. The system receives from an initiating entity, an electronic communication at a receiving entity. The system provides the electronic communication to a large language model. The system provides instructions to the large language mode, which cause the large language model to: evaluate the electronic communication to determine whether a meeting is requested, produce a meeting indicator indicative of whether the meeting is requested, evaluate the electronic communication to determine whether the electronic communication contains one or more tasks, produce a task list including the one or more tasks, and produce a responsive electronic communication, the responsive electronic communication being tailored by a user-defined rule set. The system receives a dataset from the large language model, the dataset comprising the meeting indicator, the task list, and the responsive electronic communication. The system identifies a mutually available meeting time between the initiating entity and the receiving entity. The system sends a meeting invitation to the initiating entity at the mutually available meeting time. The system sends a meeting invitation to the initiating entity at the mutually available meeting time. The system generates the one or more tasks based upon the task list and provides the one or more tasks to the receiving entity.

The system of the preceding paragraph can optionally include, additionally and/or alternatively, any one or more of the following features, configurations and/or additional components.

In a further embodiment of the foregoing system, the mutually available meeting time is the first available meeting time identified between the initiating entity and the receiving entity.

In a further embodiment of the foregoing system, a duration of the mutually available meeting time is set to a default value.

In a further embodiment of the foregoing system, the large language model is further instructed to determine whether the one or more tasks include a completion date and wherein the large language model is further instructed to include the completion date of the one or more tasks within the task list.

In a further embodiment of the foregoing system, the computer-readable memory is further encoded with instructions that, when executed by the one or more processors, cause the system to provide a tuning input to the large language model, the tuning input being used for training the large language model to produce the responsive electronic communication.

In a further embodiment of the foregoing system, the tuning input includes an example interaction, the example interaction including an example large language model input and an example expected response.

In a further embodiment of the foregoing system, the large language model is further instructed to provide the dataset in a specified format.

In a further embodiment of the foregoing system, the meeting indicator is a Boolean variable, indicative of whether a meeting is required or not required.

In a further embodiment of the foregoing system, the large language model is further instructed to include an identifier for the initiating entity with the one or more tasks within the task list.

In a further embodiment of the foregoing system, the large language model is further instructed to evaluate, from the electronic communication, whether there are one or more additional entities in addition to the initiating entity that are to be included in the meeting and wherein the large language model is further instructed to produce a list of the one or more additional entities.

A method for using generative artificial intelligence (AI) for automating electronic communication responses, includes receiving an electronic communication from an initiating entity at a receiving entity. The method further includes providing the electronic communication to a large language model. The method further includes providing instructions to the large language model which cause the large language model to: evaluate the electronic communication to determine whether a meeting is requested, produce a meeting indicator indicative of whether a meeting is requested, evaluate the electronic communication to determine whether the electronic communication contains one or more tasks, produce a task list including the one or more tasks, and produce a responsive electronic communication, the responsive electronic communication being tailored by a user-defined rule set. The method further includes receiving a dataset from the large language model, the dataset comprising the meeting indicator, the task list, and the responsive electronic communication. The method further includes identifying a mutually available meeting time between the initiating entity and the receiving entity. The method further includes sending a meeting invitation to the initiating entity at the mutually available meeting time. The method further includes sending the responsive electronic communication to the initiating entity as a response to the electronic communication. The method further includes generating the one or more tasks based upon the task list and providing the one or more tasks to the receiving entity.

The method of the preceding paragraph can optionally include, additionally and/or alternatively, any one or more of the following features, configurations and/or additional components.

In a further embodiment of the foregoing method, the mutually available meeting time is the first available meeting time identified between the initiating entity and the receiving entity.

In a further embodiment of the foregoing method, a duration of the mutually available meeting time is set to a default value.

In a further embodiment of the foregoing method, the large language model is further instructed to determine whether the one or more tasks include a completion date and wherein the large language model is further instructed to include the completion date of the one or more tasks within the task list.

In a further embodiment of the foregoing method, the system provides a tuning input to the large language model, the tuning input being used for training the large language model to produce the responsive electronic communication.

In a further embodiment of the foregoing method, the tuning input includes an example interaction, the example interaction including an example large language model input and an example expected response.

In a further embodiment of the foregoing method, the large language model is further instructed to provide the dataset in a specified format.

In a further embodiment of the foregoing method, the meeting indicator is a Boolean variable, indicative of whether a meeting is required or not required.

In a further embodiment of the foregoing method, the large language model is further instructed to include an identifier for the initiating entity with the one or more tasks within the task list.

In a further embodiment of the foregoing method, the large language model is further instructed to evaluate, from the electronic communication, whether there are one or more additional entities in addition to the initiating entity that are to be included in the meeting and wherein the large language model is further instructed to produce a list of the one or more additional entities.

The invention claimed is:

1. A system for using generative artificial intelligence (AI) for automating electronic communication responses, the system comprising:
   a processor; and
   computer-readable memory encoded with instructions that, when executed by the processor, cause the system to:

receive, from an initiating entity, an electronic communication at a receiving entity;
provide the electronic communication to a large language model;
provide a tuning input to the large language model, the tuning input being used for training the large language model to produce a responsive electronic communication;
provide instructions to the large language model which cause the large language model to:
  evaluate the electronic communication to determine whether a meeting is requested;
  produce a meeting indicator indicative of whether the meeting is requested;
  evaluate the electronic communication to determine whether the electronic communication contains one or more tasks;
  produce a task list including the one or more tasks;
  produce the responsive electronic communication, the responsive electronic communication being tailored by a user-defined rule set;
receive a dataset from the large language model, the dataset comprising the meeting indicator, the task list, and the responsive electronic communication;
identify a mutually available meeting time between the initiating entity and the receiving entity;
send a meeting invitation to the initiating entity at the mutually available meeting time;
send the responsive electronic communication to the initiating entity as a response to the electronic communication; and
generate the one or more tasks based upon the task list and provide the one or more tasks to the receiving entity.

2. The system of claim 1, wherein the mutually available meeting time is the first available meeting time identified between the initiating entity and the receiving entity.

3. The system of claim 2, wherein a duration of the mutually available meeting time is set to a default value.

4. The system of claim 1, wherein the large language model is further instructed to determine whether the one or more tasks include a completion date and wherein the large language model is further instructed to include the completion date of the one or more tasks within the task list.

5. The system of claim 1, wherein the tuning input includes an example interaction, the example interaction including an example large language model input and an example expected response.

6. The system of claim 1, wherein the large language model is further instructed to provide the dataset in a specified format.

7. The system of claim 1, wherein the meeting indicator is a Boolean variable, indicative of whether a meeting is required or not required.

8. The system of claim 1, wherein the large language model is further instructed to include an identifier for the initiating entity with the one or more tasks within the task list.

9. The system of claim 1, wherein the large language model is further instructed to evaluate, from the electronic communication, whether there are one or more additional entities in addition to the initiating entity that are to be included in the meeting and wherein the large language model is further instructed to produce a list of the one or more additional entities.

10. A method for using generative artificial intelligence (AI) for automating electronic communication responses, the method comprising:
receiving an electronic communication from an initiating entity at a receiving entity;
providing the electronic communication to a large language model;
providing a tuning input to the large language model, the tuning input being used for training the large language model to produce a responsive electronic communication;
providing instructions to the large language model which cause the large language model to:
  evaluate the electronic communication to determine whether a meeting is requested;
  produce a meeting indicator indicative of whether a meeting is requested;
  evaluate the electronic communication to determine whether the electronic communication contains one or more tasks;
  produce a task list including the one or more tasks;
  produce the responsive electronic communication, the responsive electronic communication being tailored by a user-defined rule set;
receiving a dataset from the large language model, the dataset comprising the meeting indicator, the task list, and the responsive electronic communication;
identifying a mutually available meeting time between the initiating entity and the receiving entity;
sending a meeting invitation to the initiating entity at the mutually available meeting time;
sending the responsive electronic communication to the initiating entity as a response to the electronic communication; and
generating the one or more tasks based upon the task list and providing the one or more tasks to the receiving entity.

11. The method of claim 10, wherein the mutually available meeting time is the first available meeting time identified between the initiating entity and the receiving entity.

12. The method of claim 11, wherein a duration of the mutually available meeting time is set to a default value.

13. The method of claim 10, wherein the large language model is further instructed to determine whether the one or more tasks include a completion date and wherein the large language model is further instructed to include the completion date of the one or more tasks within the task list.

14. The method of claim 10, wherein the tuning input includes an example interaction, the example interaction including an example large language model input and an example expected response.

15. The method of claim 10, wherein the large language model is further instructed to provide the dataset in a specified format.

16. The method of claim 10, wherein the meeting indicator is a Boolean variable, indicative of whether a meeting is required or not required.

17. The method of claim 10, wherein the large language model is further instructed to include an identifier for the initiating entity with the one or more tasks within the task list.

18. The method of claim 10, wherein the large language model is further instructed to evaluate, from the electronic communication, whether there are one or more additional entities in addition to the initiating entity that are to be included in the meeting and wherein the large language model is further instructed to produce a list of the one or more additional entities.

* * * * *